(12) United States Patent
Diethorn

(10) Patent No.: US 7,924,995 B2
(45) Date of Patent: Apr. 12, 2011

(54) TELECONFERENCING SYSTEM WITH MULTI-CHANNEL IMAGING

(75) Inventor: Eric John Diethorn, Long Valley, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1016 days.

(21) Appl. No.: 11/742,559

(22) Filed: Apr. 30, 2007

(65) Prior Publication Data

US 2008/0232569 A1    Sep. 25, 2008

Related U.S. Application Data

(60) Provisional application No. 60/895,564, filed on Mar. 19, 2007.

(51) Int. Cl.
*H04M 3/42* (2006.01)

(52) U.S. Cl. .............. 379/202.01; 379/261; 379/203.01; 379/204.01; 379/205.01; 379/206.01; 455/416; 709/204

(58) Field of Classification Search .................. 379/261, 379/202.01, 203.01, 204.01, 205.01, 206–1, 379/207.01; 455/416; 709/204
See application file for complete search history.

(56) References Cited

U.S. PATENT DOCUMENTS

| | | | |
|---|---|---|---|
| 4,734,934 A | | 3/1988 | Boggs et al. |
| 5,483,588 A * | | 1/1996 | Eaton et al. ............. 379/202.01 |
| 6,178,237 B1 * | | 1/2001 | Horn ....................... 379/202.01 |
| 6,850,496 B1 * | | 2/2005 | Knappe et al. ................ 370/260 |
| 7,158,624 B1 * | | 1/2007 | O'Toole, Jr. ............. 379/202.01 |
| 2005/0207554 A1 * | | 9/2005 | Ortel ....................... 379/202.01 |
| 2005/0213728 A1 * | | 9/2005 | Rodman et al. ......... 379/202.01 |
| 2005/0213739 A1 * | | 9/2005 | Rodman et al. ......... 379/202.01 |
| 2005/0213747 A1 | | 9/2005 | Popovich et al. |
| 2006/0013416 A1 | | 1/2006 | Truong et al. |
| 2006/0209730 A1 * | | 9/2006 | Bautista ....................... 370/285 |
| 2007/0264988 A1 * | | 11/2007 | Wilson et al. ................ 455/416 |

* cited by examiner

*Primary Examiner* — Curtis Kuntz
*Assistant Examiner* — Joseph J Nguyen
(74) *Attorney, Agent, or Firm* — DeMont & Breyer, LLC

(57) ABSTRACT

A method is disclosed that breaks the "one line, one location" paradigm of teleconferencing in the prior art. The teleconference bridge in the illustrative embodiment is able to utilize more than one audio channel from each location. By having access to more than one audio channel from a teleconference location's sound field, the bridge is able to create a multi-channel effect during a conference call. When more than one microphone is present in the first sound field, they can be used to create a multi-channel effect in a second or other sound field involved in a conference call that has more than one loudspeaker. With the bridge mimicking the multi-channel imaging in one room with the multi-channel imaging in another, the conference call participants can experience audio depth during a conference call and can experience two-dimensional imaging, depending on the microphone or speaker separation that is present.

27 Claims, 14 Drawing Sheets

TELECONFERENCING SYSTEM WITH MULTI-CHANNEL IMAGING

CROSS-REFERENCE TO RELATED APPLICATIONS

This application claims the benefit of:
(1) U.S. Patent Application Ser. No. 60/895564, filed on Mar. 19, 2007,
which is incorporated herein by reference.

FIELD OF THE INVENTION

The present invention relates to telecommunications in general, and, more particularly, to an improved teleconferencing system.

BACKGROUND OF THE INVENTION

FIG. 1 depicts a schematic diagram of teleconference system 100 in the prior art. System 100 comprises telecommunications endpoints 101-1 through 101-J, wherein J is an integer greater than one; private branch exchange (PBX) 102; telecommunications network 103; and teleconference bridge 104, interconnected as shown.

Telecommunications endpoint 101-$j$, where j has a value between 1 and J, inclusive, is capable of handling a telephone call for its user. Endpoint 101-$j$ is able to call, or to be called by, another endpoint. In order to participate in a conference call, endpoint 101-$j$ is able to dial a telephone number that routes to teleconference bridge 104. Endpoint 101-$j$ can be a cellular phone, a conference phone (i.e., "speakerphone"), a deskset, or some other type of telecommunications appliance.

Some of endpoints 101-1 through 101-J are PBX terminals, such as those in an office enterprise network, for which telecommunications service is enabled by private branch exchange 102.

Telecommunications network 103 provides the connectivity among endpoints 101-1 through 101-J, exchange 103, and teleconference bridge 104. Telecommunications network 103 comprises a transmission network—for example, the Public Switched Telephone Network, which is a complex of telecommunications equipment that is owned and operated by different entities throughout the World. Network 103 can also comprise the Internet or possibly other Internet Protocol-based networks.

Teleconference bridge 104 is a server or switch that enables the users of multiple endpoints to communicate with each other during a conference call. Bridge 104 receives audio signals from endpoints that are participating on a conference call, mixes those signals together, and transmits the mixed signals back to the endpoints.

As depicted in FIG. 1, system 100 is a traditional teleconferencing system for J teleconference locations, where a location is defined by a single endpoint (i.e., endpoint 101-$j$), supported by a teleconference bridge (i.e., bridge 104). Some of the endpoints are speakerphones, which are designed specifically to handle conference call communication. Each speakerphone is connected to the bridge via a monophonic, bi-directional channel. If any given speakerphone at a teleconference location has multiple feeds—that is, a main microphone and one or more satellite microphones, or a main loudspeaker and one or more satellite loudspeakers—they are combined at the speakerphone itself into the monophonic channel transmitted by that speakerphone to the bridge. This is depicted in FIG. 2, showing an overhead view in which endpoint 101-11 is situated on table 202 of conference room 201. Endpoint 101-11, a speakerphone, comprises satellite microphones 203-1 and 203-2, as well as loudspeaker 204.

During operation, the monophonic feed from each endpoint, such as endpoint 101-11, is fed into bridge 104, which adds the feeds, and the sum is distributed by the bridge back to the speakerphones at the other locations. Each speakerphone at each location receives a signal via a monophonic channel from the bridge, which signal is played out of all loudspeakers connected to that speakerphone. In the operation of any such traditional bridge, the monophonic signal received by any endpoint 101-$j$ contains components of one or more other endpoints 101-$k$, $k \neq j$, but explicitly excludes components of the signal sent to the bridge by endpoint 101-$j$. By doing so, bridge 104 prevents regenerative acoustic feedback that would otherwise occur.

Each monophonic, bi-directional channel is associated with a phone line that terminates at the conference bridge. From the bridge's perspective, each channel and line equates to a different "location," even though conference call participant who are using a speakerphone and a participant who is using a cell phone might be present in the same conference room.

SUMMARY OF THE INVENTION

The present invention breaks the "one line, one location" paradigm of teleconferencing in the prior art. The teleconference bridge in the illustrative embodiment is able to utilize more than one audio channel from each location, where there are multiple signal sources present in the room. For example, a participant's cell phone can be used as a satellite microphone to augment or replace the speakerphone's microphone at the same location, for the purpose of improving the audio quality experienced on the conference call. As another example, more than one deskset endpoint can be situated in a conference room, each with its own port at the teleconference bridge of the illustrative embodiment; the bridge can mix the audio signals coming from and going to the multiple desksets in a way that optimizes audio quality and avoids acoustic feedback between participating phones located within the same acoustic space.

Specifically, by having access to more than one audio channel from a teleconference location's sound field, the teleconference bridge of the illustrative embodiment is able to create a multi-channel effect during a conference call. When more than one microphone is present in the first sound field (i.e., $M_1$ is greater than one), they can be used to create a multi-channel effect in a second or other sound field involved in a conference call that has more than one loudspeaker (i.e., $N_2$ is greater than one). Where a first location has $M_1$ microphones and a second location has $N_2$ loudspeakers where $M_1 > N_2$, the bridge mixes down to a smaller number of loudspeaker channels. Where a first room has $M_1$ microphones and a second room has $N_2$ loudspeakers where $M_1 < N_2$, the bridge mixes to a larger number of loudspeaker channels.

In accordance with the illustrative embodiment, the bridge is also able to keep track of the relative positions of the endpoints within each sound field, for the purpose of properly imaging the sound fields across teleconference locations. For example, for a three-channel system, the teleconference bridge transmits the signals from microphone channel "A" in the first sound field to loudspeaker channel "A" in the second sound field, the signals from microphone channel B to loudspeaker channel B, and the signals from microphone channel C to loudspeaker channel C. By acquiring and using information about the relative positions of endpoints in a sound field, the bridge ensures that the first sound field represented as microphone channels A-B-C is mimicked in the second sound field as "A-B-C", and not as "A-C-B".

With the bridge of the illustrative embodiment mimicking the multi-channel imaging in one room with the multi-channel imaging in another, the conference call participants can experience audio depth during a conference call and can experience two-dimensional imaging, depending on the amount of microphone or speaker separation that is present.

The illustrative embodiment of the present invention comprises: determining, at a teleconference bridge, the presence of i) a first endpoint and a second endpoint at a first teleconference location, the teleconference bridge being able to receive audio signals from each of the first endpoint and the second endpoint, and ii) a third endpoint and a fourth endpoint at a second teleconference location, the teleconference bridge being able to transmit audio signals to each of the third endpoint and the fourth endpoint, wherein the first teleconference location and the second teleconference location are acoustically isolated from each other; assigning i) the first endpoint and the third endpoint to a first audio channel, and ii) the second endpoint and the fourth endpoint to a second audio channel; receiving i) a first audio signal from the first endpoint, and ii) a second audio signal from the second endpoint; and transmitting i) a third audio signal to all endpoints that have been assigned to the first audio channel at the second teleconference location, wherein the third audio signal is based on the first audio signal, and ii) a fourth audio signal to all endpoints that have been assigned to the second audio channel at the second teleconference location, wherein the fourth audio signal is based on the second audio signal.

DETAILED DESCRIPTION

The following terms are defined for use in this Specification, including the appended claims:

The term "acoustic collocation," and its inflected forms, is defined as the state in which a first endpoint is receiving, via its microphone, at least a component of a signal that has been transmitted to a second endpoint and outputted via the second endpoint's loudspeaker. When this occurs, the first endpoint is said to be "acoustically collocated" with the second endpoint, in addition to being in the same sound field as the second endpoint. Note that in this case, the second endpoint might also be acoustically collocated with the first endpoint, but not necessarily.

The term "sufficient correlation," and its inflected forms, is defined as the state in which the teleconference bridge of the illustrative embodiment transmits a first audio signal to a second endpoint and receives back a second audio signal from a first endpoint, and the received second signal resembles the transmitted first signal closely enough to conclude that the second signal is related to the first. Determining whether one signal is "sufficiently correlated" with another is one way to determine whether one endpoint is acoustically collocated with another.

The term "acoustic isolation," and its inflected forms, is defined as the state in which a first teleconference location (e.g., a conference room, the place where someone is conferencing in from their cell phone, etc.) is sufficiently distant from other teleconference locations such that the first location does not acoustically interfere with or is not acoustically interfered on by the other locations during a conference call. The two teleconference locations are said to be in different sound fields from each other.

Figure 1:
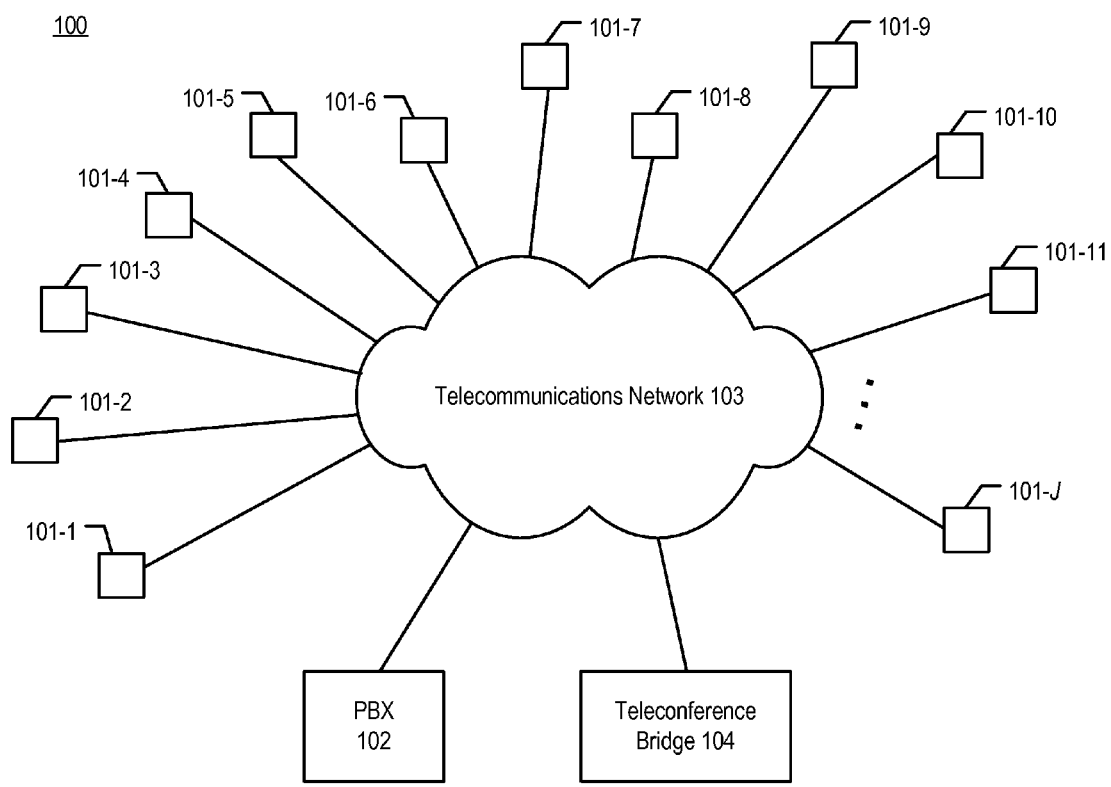
FIG. 1 depicts a schematic diagram of teleconference system 100 in the prior art.
Figure 2:
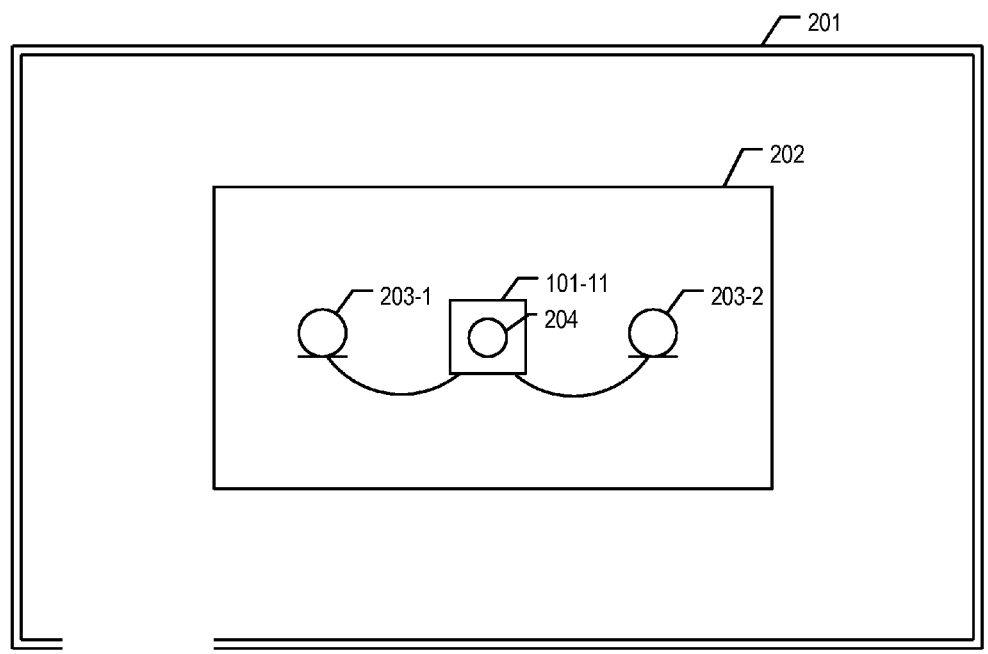
FIG. 2 depicts an overhead view of conference room 201, as well as telecommunications endpoint 101-11 of system 100.
Figure 3:
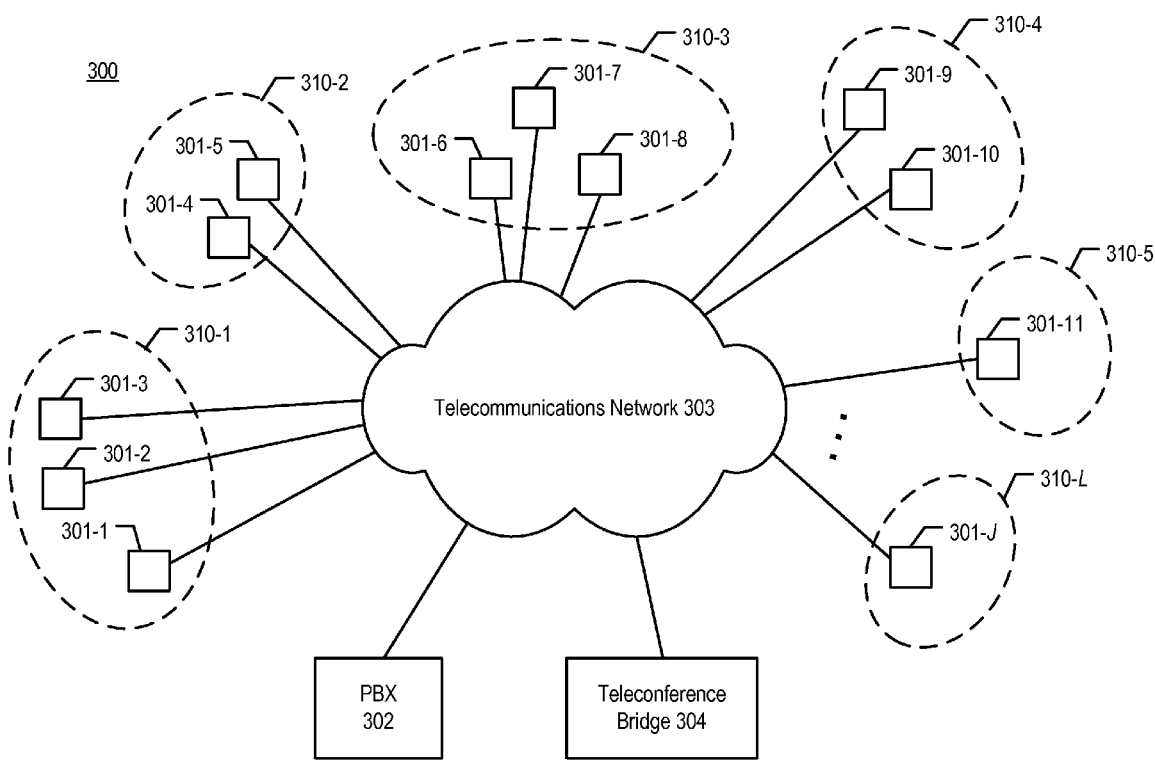
FIG. 3 depicts schematic diagram of the salient components of teleconference system 300 in accordance with the illustrative embodiment of the present invention.

FIG. 3 depicts schematic diagram of the salient components of teleconference system 300 in accordance with the illustrative embodiment of the present invention. System 300 comprises telecommunications endpoints 301-1 through 301-J, wherein J is an integer greater than one; private branch exchange (PBX) 302; telecommunications network 303; and teleconference bridge 304, interconnected as shown.

Telecommunications endpoint 301-j, where j has a value between 1 and J, inclusive, is capable of originating, receiving, or otherwise handling a telephone call for its user. Endpoint 301-j is able to call, or to be called by, another endpoint. In order to participate in a conference call, endpoint 301-j able to dial a telephone number that routes to teleconference bridge 304. Endpoint 301-j can be an analog telephone, an ISDN terminal, a softphone, an Internet-Protocol phone, a cellular phone, a cordless phone, a PBX deskset, a conference phone (i.e., "speakerphone"), or some other type of telecommunications appliance. It will be clear to those skilled in the art how to make and use endpoint 301-j.

Some of endpoints 301-1 through 301-J are PBX terminals, such as those in an office enterprise network, for which telecommunications service is enabled by private branch exchange 302, as is well-known in the art.

Telecommunications network 303 provides the connectivity among endpoints 301-1 through 301-J, exchange 303, and teleconference bridge 304. Network 303 comprises the Public Switched Telephone Network, which is a complex of telecommunications equipment that is owned and operated by different entities throughout the World. In the United States of America, for example, the Public Switched Telephone Network (or "PSTN") comprises an address space that is defined by ten digits, and, therefore, comprises 10 billion unique addresses or "telephone numbers." The public switched telephone networks in other countries are similar. In some embodiments, network 303 comprises the Internet or possibly other Internet Protocol-based networks, either in addition to or as opposed to the PSTN.

It will be clear to those skilled in the art, after reading this specification, how to make and use embodiments of the present invention that comprise various combinations of networks within teleconference system 300, which networks are public or private, wired or wireless, and circuit-based or packet-based.

Teleconference bridge 304 is a server or switch that enables the users of multiple endpoints to communicate with each other during a conference call. Bridge 304 receives audio signals from endpoints that are participating on a conference call, mixes those signals together based on the transfer function associated with each output channel, and transmits the mixed signals back to the endpoints, in accordance with the illustrative embodiment of the present invention. Bridge 304 is described in detail below and with respect to FIG. 5.

As those who are skilled in the art will appreciate, the techniques of the illustrative embodiment can be implemented at a device other than a teleconference bridge or at a teleconference bridge that is other than a server or switch.

Figure 4:
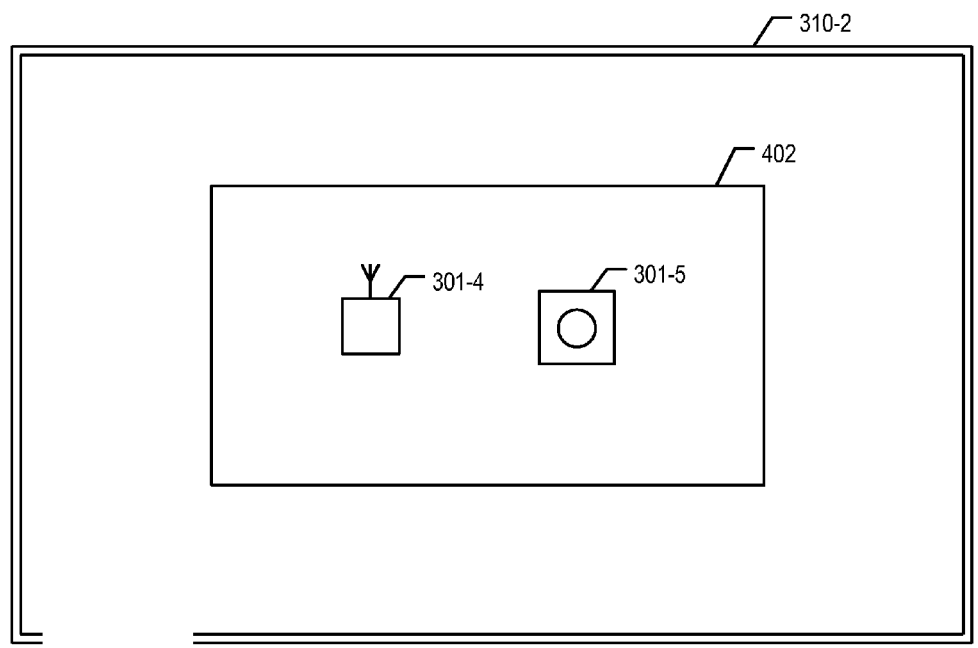
FIG. 4 depicts an overhead view of teleconference location 310-2, as well as telecommunications endpoints 301-4 and 301-5 of system 300.

FIG. 3 depicts the endpoints that are to participate, or are participating, in a particular conference call, which endpoints are situated at locations 310-1 through 310-L, wherein L is an integer greater than one. Each location 310-l, where l has a value between 1 and L, inclusive, comprises at least one telecommunications endpoint 301-j, where j has a value between 1 and J, inclusive. One effect of having J independent endpoints distributed across L teleconference locations is shown in FIG. 4, which depicts an overhead view of a conference room. Situated on table 402 of teleconference location 310-2 are telecommunications endpoints 301-4 and 301-5, each one an independent endpoint that is capable of placing and handling calls. For example, endpoint 301-4 might be the cell phone of someone participating on the call, while endpoint 301-5 might be a conference room phone that is situated in the conference room at location 310-2.

Figure 5:
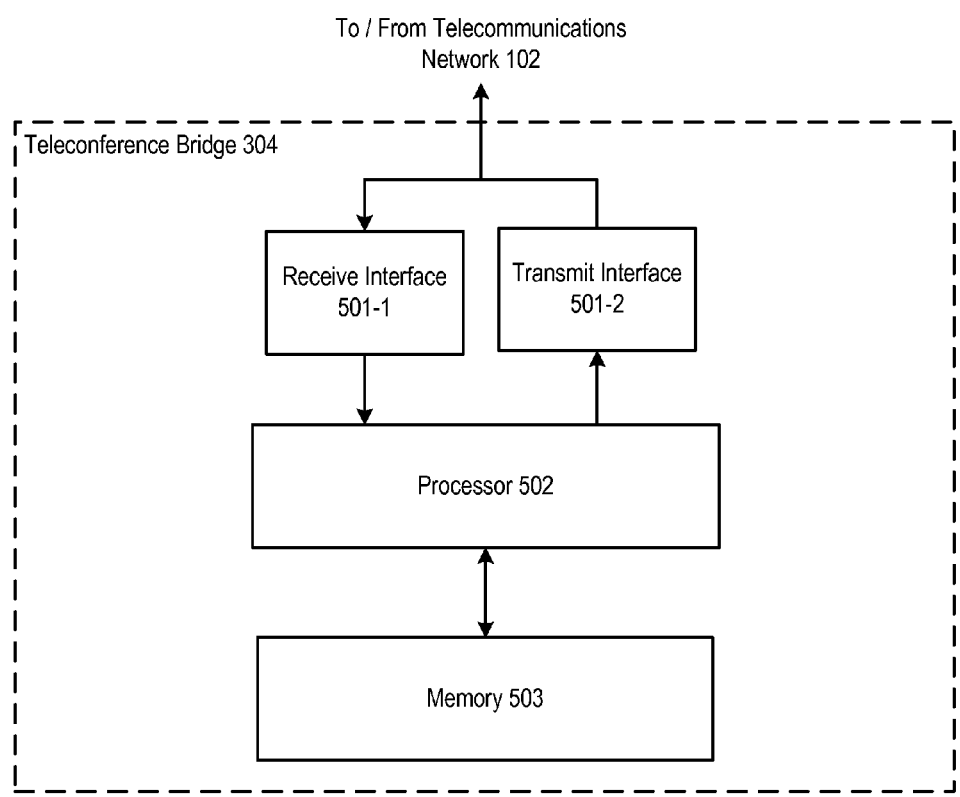
FIG. 5 depicts a block diagram of the salient components of teleconference bridge 304, in accordance with the illustrative embodiment of the present invention.

FIG. 5 depicts a block diagram of the salient components of teleconference bridge 304, in accordance with the illustrative embodiment of the present invention. Bridge 304 comprises receive interface 501-1, transmit interface 501-2, processor 502, and memory 503, interconnected as shown. Bridge 304 is capable of performing the tasks described below and with respect to FIGS. 6 through 14.

Receive interface 501-1 and transmit interface 502-2 comprise the circuitry that enables bridge 304 to respectively receive signals from and transmit signals to network 303, in well-known fashion. In accordance with the illustrative embodiment, bridge 304 receives and transmits audio signals that are represented in Internet Protocol packets, in well-known fashion. As those who are skilled in the art will appreciate, in some alternative embodiments bridge 304 receives and transmits audio signals represented in a different format.

Processor 502 is a general-purpose processor that is capable of receiving information from receive interface 501-1, of executing instructions stored in memory 503, of reading data from and writing data into memory 503, and of transmitting information to transmit interface 501-2. In some alternative embodiments of the present invention, processor 502 might be a special-purpose processor. Processor 502 performs the audio mixing function at bridge 304, in accordance with the illustrative embodiment of the present invention. As part of the audio mixing function, processor 502 is able to take any input audio signal from any endpoint or other source and mix it into the composite output audio signal to be transmitted to a particular endpoint, for all endpoints to which audio signals are to be transmitted. The specific output signal to a given endpoint is based on the mixer transfer function associated with that output signal, as determined in the illustrative embodiment.

Memory 503 stores the instructions and data used by processor 502, in well-known fashion. Memory 503 might be any combination of dynamic random-access memory (RAM), flash memory, disk drive memory, and so forth.

In accordance with the illustrative embodiment, bridge 304 communicates with each endpoint 301-j via a different communication port, as is known in the art. As those who are skilled in the art will appreciate, the ports can be implemented in software or in hardware, or both. It will be clear to those skilled in the art how to make and use teleconferencing systems where an endpoint has its own port at bridge 304 or an endpoint shares a port with another endpoint, or both.

In accordance with the illustrative embodiment, bridge 304 is able to receive on $M_L$ input channels from endpoints at the combined teleconference locations and to transmit on $N_L$ output channels to endpoints at those locations. The values of $M_L$ and $N_L$ can be equal to or different from each other; in other words, some endpoints might be microphone-only devices, some might be loudspeaker-only devices, and some might comprise both microphones and loudspeakers. Bridge 304 is capable of unidirectional communication with the microphone-only devices or loudspeaker-only devices, and of bi-directional communication with the devices comprising both a microphone and loudspeaker.

FIGS. 6 and 10 through 14 depict flowcharts of salient tasks that are related to preparing for, establishing, and managing a teleconference call, as performed by teleconference bridge 304, in accordance with the illustrative embodiment of the present invention. As those who are skilled in the art will appreciate, some of the tasks that appear in the flowcharts that follow can be performed in parallel or in a different order than that depicted. Moreover, those who are skilled in the art will further appreciate that in some alternative embodiments of the present invention, only a subset of the depicted tasks are performed.

Figure 6:
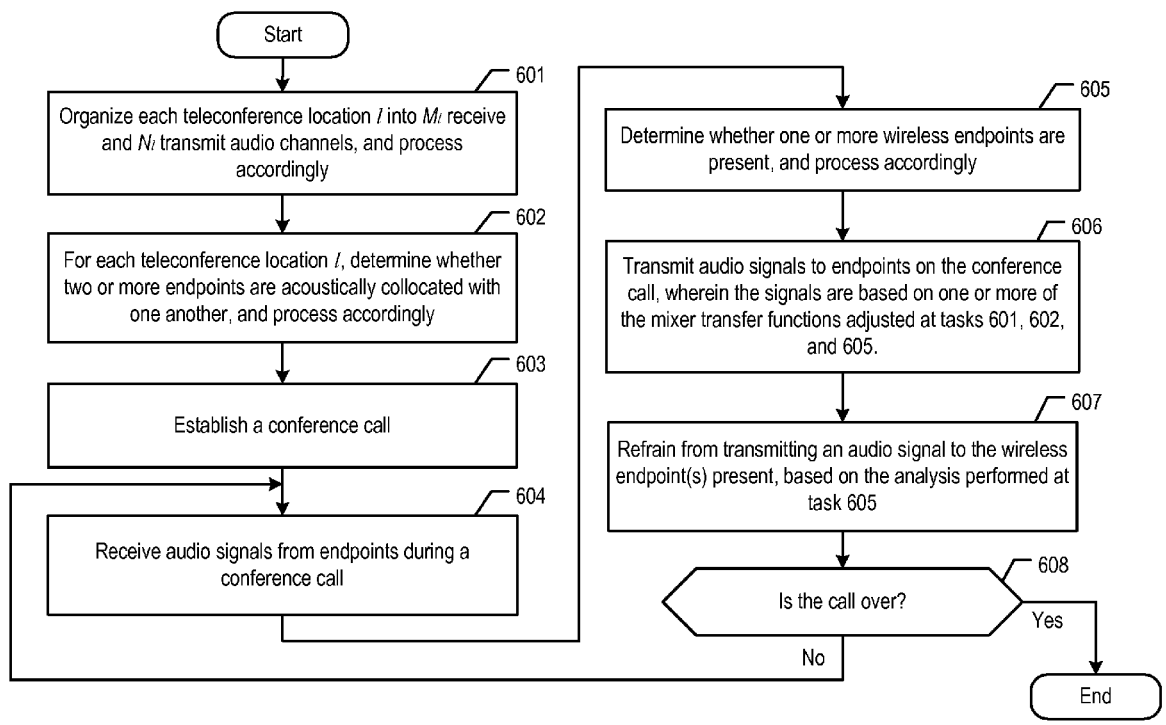
FIG. 6 depicts a flowchart of the overall salient tasks that are related to preparing for, establishing, and managing a teleconference call, as performed by teleconference bridge 304, in accordance with the illustrative embodiment of the present invention.

Referring now to FIG. 6, at task 601 bridge 304 organizes each teleconference location 310-l into $M_l$ receive channels and $N_l$ transmit channels, and processes those channels accordingly. In accordance with the illustrative embodiment, when more than one microphone is present in the first sound field (i.e., $M_1$ is greater than one), the microphones can be used to create a multi-channel effect (e.g., stereo, three-channel, etc.) in the other sound fields that are involved in a conference call. In preparation for the conference call, bridge 304 first determines that multi-channel imaging is possible by detecting the existence of a first sound field with two or more microphones and a second sound field with two or more loudspeakers.

Figure 7A:
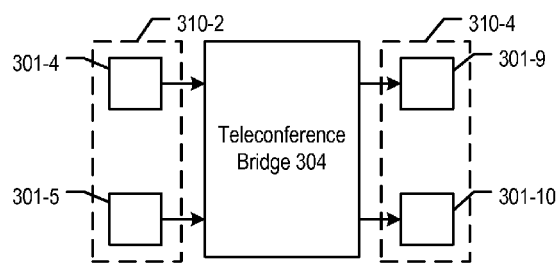
FIGS. 7A through 7D depict some illustrative examples of how the number of channels may vary across the teleconference locations, as related to task 601 in FIG. 6.
Figure 7B:
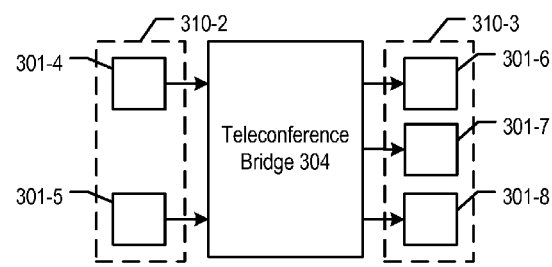
Figure 7C:
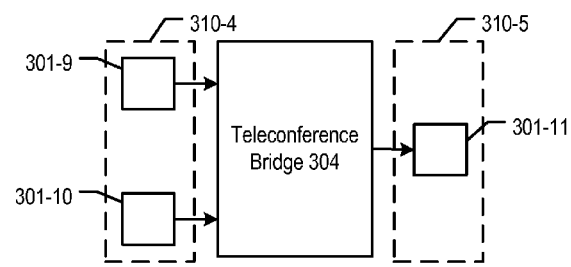
Figure 7D:
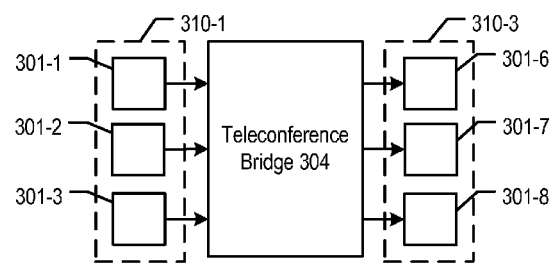

FIGS. 7A through 7D depict illustrative examples of how the number of audio channels may vary across the teleconference locations, as related to task 601, and as a result, how the mixing of the audio signals will vary between different pairs of teleconference locations. The depicted examples are intended to provide an overview, while details that are related to task 601 are described below and with respect to FIG. 10. FIG. 7A depicts an example of where $M_2$ (i.e., the number of microphones at location 310-2) is equal to $N_4$ (i.e., the number of loudspeakers at location 310-4), where $M_2$ and $N_4$ are equal to two. FIG. 7B depicts an example of where $M_2$ (i.e., location 310-2 microphones) is less than $N_3$ (i.e., location 310-3 loudspeakers); in this situation, bridge 304 mixes to a larger number of loudspeaker channels than microphone channels. FIG. 7C depicts an example of where $M_4$ (i.e., location 310-4 microphones) is greater than $N_5$ (i.e., location 310-5 loudspeakers); in this situation, bridge 304 mixes down to a smaller number of loudspeaker channels than microphone channels. And in FIG. 7D, $M_1$ (i.e., the number of microphones at location 310-1) is depicted as being equal to $N_3$ (i.e., the number of loudspeakers at location 310-3), where $M_1$ and $N_3$ are equal to three. It will be clear to those skilled in the art how to make and use embodiments of the invention that involve other teleconference locations with different numbers of microphones and loudspeakers than those depicted.

Figure 8:
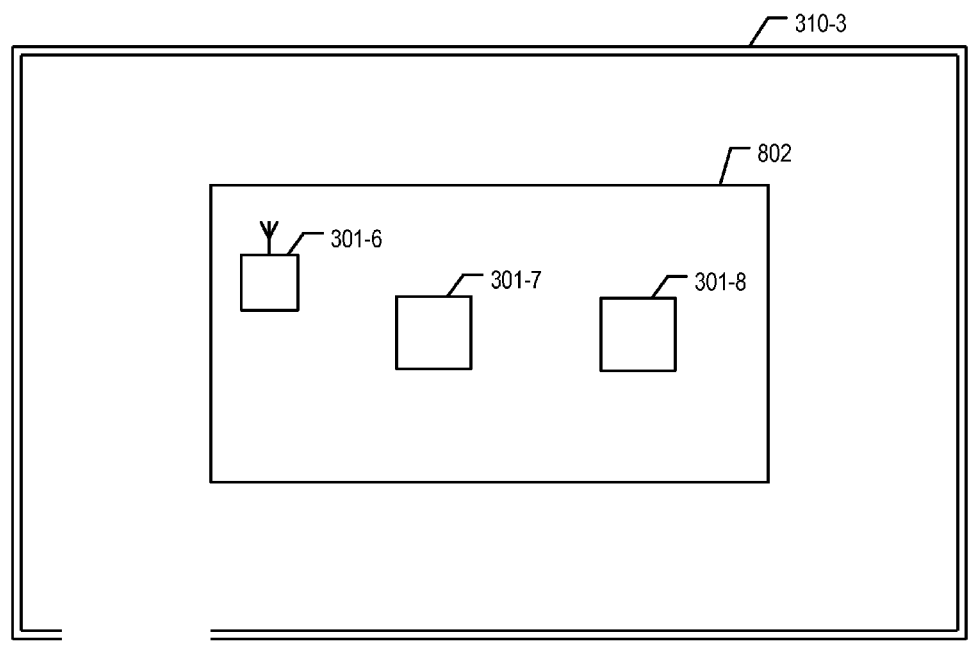
FIG. 8 depicts telecommunications endpoints 301-6, 301-7, and 301-8, some of which might be acoustically collocation with each other, as determined at task 602 of FIG. 6.

At task 602, bridge 304 determines for each location whether two are more endpoints are acoustically collocated, and processes signals for those endpoints accordingly. The purpose of doing so is to determine whether the sound coming from the loudspeaker of any one endpoint will adversely feed back into the microphone of another. FIG. 8 depicts this possibility of feedback, in which situated on table 802 of teleconference location 310-3 are telecommunications endpoints 301-6, 301-7, and 301-8, each one an independent endpoint that is capable of handling calls. For example, deskset endpoints 301-7 and 301-8 are close enough that they might cause feedback problems with each other unless their signals are conditioned; the same can be said of cell phone 301-6 and deskset 301-7. At the same time, however, cell phone 301-6 and deskset 301-8 might not cause feedback issues with each other, possibly because they are sufficiently separated. Although FIG. 8 is intended to provide an example of acoustic collocation, details that are related to task 602 for determining acoustic collocation are described below and with respect to FIG. 11.

At task 603, bridge 304 establishes a conference call in well-known fashion. involving endpoints 301-1 through 301-J.

At task 604, bridge 304 during the conference call continually receives audio signals $s_1$ through $s_J$ from endpoints 301-1 through 301-J, in well-known fashion.

At task 605, bridge 304 determines whether one or more endpoints are appearing at or disappearing from one or more of the teleconference locations, and processes signals for those endpoints accordingly. These endpoints of interest can be cell phones, other types of mobile or portable endpoints, or normally stationary endpoints (e.g., desksets, etc.) that are suddenly plugged into the call at an existing teleconference location. Bridge 304 monitors endpoints because they can conceivably wander in and out of a sound field (or sound fields) involved in the call, as described in the following scenario described with respect to FIG. 9, and possibly affect the audio quality experienced by the participants.

Figure 9A:
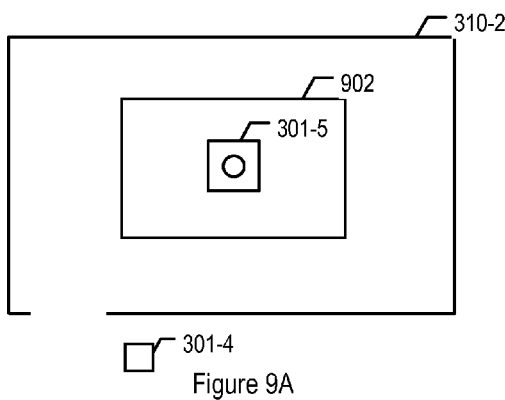
FIGS. 9A through 9D depict an overview of a chain of events that involve cell phone 301-4 being used by a participant to the conference call, as related to task 605 of FIG. 6.
Figure 9B:
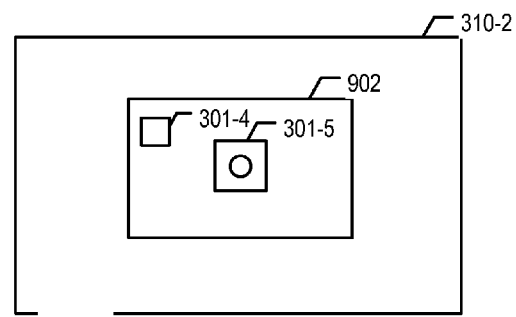
Figure 9C:
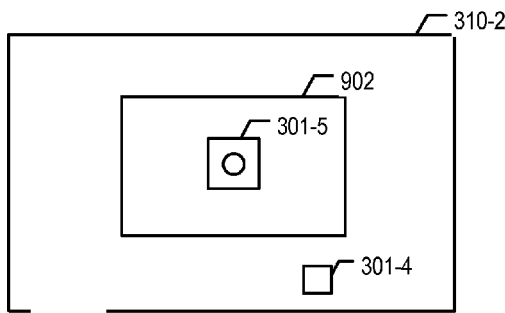
Figure 9D:
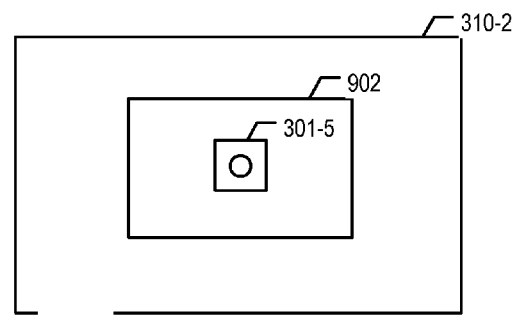

FIGS. 9A through 9D depict an overview of a chain of events as related to task 605 that involve endpoint 301-4, a cell phone, being used by a participant of the conference call. Note that details that are related to task 605 are described below and with respect to FIG. 12. In this sequence of events, bridge 304 monitors cell phone 301-4. As depicted in FIG. 9A, the participant approaches teleconference location 310-2. When bridge 304 determines that cell phone 301-4 is present in location 310-2's sound field, the bridge adjusts the signals that it transmits to both cell phone 301-4 and to other endpoints in the sound field such as endpoint 301-5, a conference phone. As depicted in FIG. 9B, the attendee then puts her cell phone on the table in front of her (i.e., on table 902). At this point, the cell phone's microphone is used as a satellite microphone, and there is no need to feed back the audio signals of the conference call to cell phone 301-4. The output of bridge 304 is fed to the loudspeaker of the stand-alone conference phone in the room, namely endpoint 301-5. As depicted in FIG. 9C, the cell phone user gets up and walks around the room, carrying her cell phone, in which case bridge 304 compensates by possibly resuming the feeding of audio to cell phone 301-4. And as depicted in FIG. 9D, the cell phone user then leaves the room, possibly to go to another teleconference location that is part of the same conference call in another part of the building; in response, bridge 304 starts feeding the audio signal from the cell phone user to endpoint 301-5.

As shown by FIGS. 9A through 9D, teleconference bridge 304 is able to adapt to the changing relationship between microphones/loudspeakers and locations. Thus, if the attendee decides to leave the room, she can take her cell phone with her and continue participating on the conference call. And if bridge 304 previously was not feeding an output signal to the cell phone, because feeding the signal to the stand-alone loudspeaker was sufficient, the bridge can then start feeding the output signal to the cell phone when the bridge detects that the phone is moving out of the room and away from the loudspeaker.

At task 606, bridge 304 during the conference call continually transmits audio signals $x_1$ through $x_J$ to endpoints 301-1 through 301-J, in well-known fashion. The transmitted signals are based on various adjustments to the mixer transfer functions that are associated with the output channels, each transfer function being adjusted at one or more of tasks 601, 602, and 605 in accordance with the illustrative embodiment of the present invention. Specifically, each transmitted signal can be based on one or more receive signals (i.e., $s_1$ through $s_J$), on a determination that a first endpoint is acoustically collocated with a second endpoint, on two signals being sufficiently correlated with each other, or on something else that affects the output signal's transfer function. Bridge 304 can exclude at least a component of one or more receive signals from a transmitted signal or can refrain from transmitting a signal entirely.

At task 607, bridge 304 refrains from transmitting an audio signal to one or more endpoints of interest that the bridge at task 605 determined were present, based on the criteria applied at task 605.

At task 608, bridge 304 determines whether the conference call has finished. If not, task execution proceeds back to task 604. If the call has finished, task execution ends.

Figure 10:
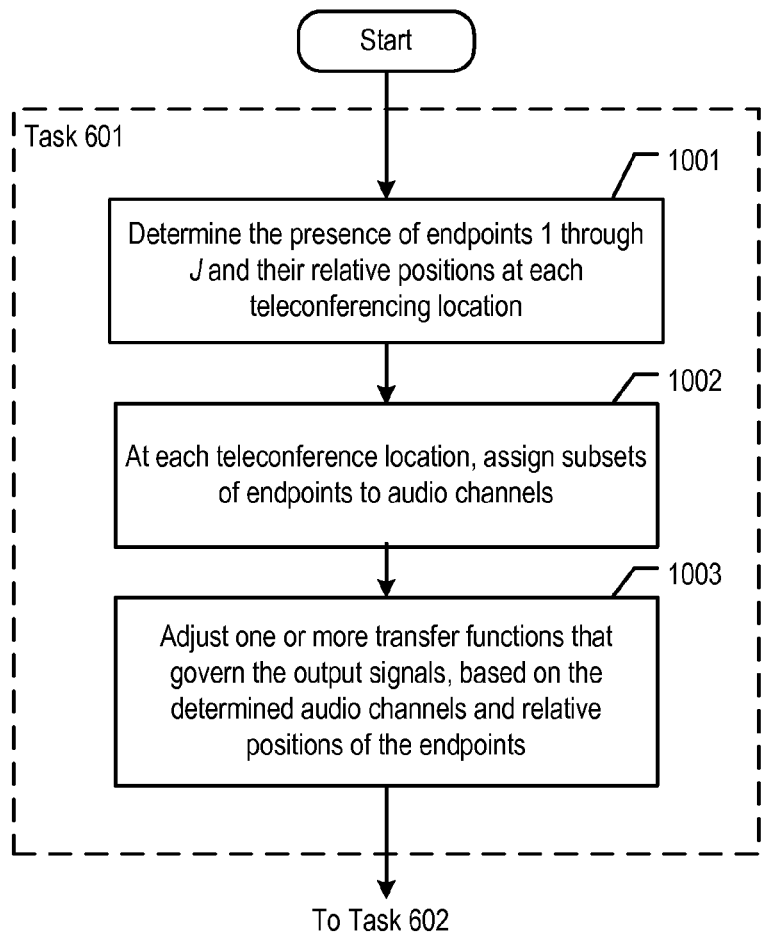
FIG. 10 depicts a flowchart of the salient subtasks that are related to organizing each teleconference location into receive audio channels and transmit audio channels, as part of task 601.

FIG. 10 depicts a flowchart of the salient subtasks that are related to organizing each teleconference location into receive audio channels and transmit audio channels, as part of task 601, in accordance with the illustrative embodiment of the present invention.

At task 1001, bridge 304 determines the presence of endpoints that are to participate in a conference call, as well as the relative positions of the endpoints at each teleconference location. In accordance with the illustrative embodiment, this determination is achieved acoustically, as described below and with respect to FIG. 13.

As those who are skilled in the art will appreciate, in some alternative embodiments bridge 304 can determine the presence of endpoints at teleconference locations and the endpoints' relative positions via other means. A first alternative means comprises receiving a calling number identifier from each endpoint that is calling into the conference call and looking up the identifier in a database that comprises information on the endpoints, as well as on their teleconference locations and relative positions at each location. A second alternative means comprises receiving information that is spoken or entered (e.g., via endpoint keypad, etc.) from each endpoint at the participating locations, where the information received from an endpoint describes the teleconference location and relative position of that endpoint and of possibly other endpoints. And a third alternative means comprises applying the technique of using geo-location measurements that is described below and with respect to task 1202.

Based on the determined relative positions of the endpoints, bridge 304 then creates, for each teleconference location 310-*l*, $P_l$ audio input channels from and $Q_l$ audio output channels to location 310-*l*. For example, if a first subset of endpoints at location 310-*l* appear to be situated on the left side of a conference room, a second subset appear to be on the right side, and a third subset appear to be in the middle, then bridge 304 creates a "left" channel, a "right" channel, and a "middle" channel, respectively.

At task 1002, bridge 304 assigns each endpoint at each teleconference location to one of the audio channels created at task 1001. Each teleconference location 310-*l* comprises $M_l$ microphones and $N_l$ loudspeakers that are assigned to $P_l$ input channels and $Q_l$ output channels associated with location 310-*l*, where the values for $M_l$ and $P_l$ can be the same or different and the values for $N_l$ and $Q_l$ can be the same or different. At those who are skilled in the art will appreciate, one or more of the $M_l$ microphones at location 310-*l* can be assigned to a particular audio input channel at bridge 304, while one or more of the $N_l$ loudspeakers at location 310-*l* can be assigned to a particular audio output channel. Bridge 304 keeps track of the P-to-Q relationship for each pair of teleconference locations and maps the channels accordingly.

As those who are skilled in the art will appreciate, after reading this specification, the value for $M_l$ across two or more endpoints can be the same or different and the value for $N_l$ can be the same or different. Furthermore, the value for $P_l$ across two or more endpoints can be the same or different and the value for $Q_l$ can be the same or different.

At task 1003, bridge 304 adjusts one or more transfer functions that govern the output signals to be transmitted during a conference call to the endpoints, based on the determined audio channels and the relative positions of the endpoints across teleconference locations. As part of this task, the mapping is established between each sound field at one location to the corresponding sound field at each other location. For example, for a three-channel system, bridge 304 transmits the signals from microphone channel "A" in the first sound field to loudspeaker channel "A" in the second sound field, the signals from microphone channel B to loudspeaker channel B, and the signals from microphone channel C to loudspeaker channel C. Bridge 304 ensures that the first sound field represented as microphone channels A-B-C is mimicked in the second sound field as "A-B-C", and not as "A-C-B". As those who are skilled in the art will appreciate, the same process applies in the other direction, in which the second sound field is represented in multi-channel audio for the listeners in the first sound field.

There can be a different number of input channels from one location than there are output channels to another location. When $P_1 > Q_2$, bridge 304 mixes the audio from the "extra" input channel into one or more of the output channels. When $P_1 < Q_2$, bridge 304 synthesizes an "extra" output channel's audio from one or more of the input channels.

In some embodiments, bridge 304 adjusts the one or more transfer functions to provide cross-channel mixing to coax the other channel's speakerphone into the receive state, for the purpose of controlling echo. For example, for teleconference location 301-4 with each of two independent speakerphones (i.e., endpoints 301-9 and 301-10) receiving a different output audio channel (i.e., "A" and "B"), bridge 304 can provide an attenuated version of the signal being fed to channel A also to channel B, or vice-versa.

Figure 11:
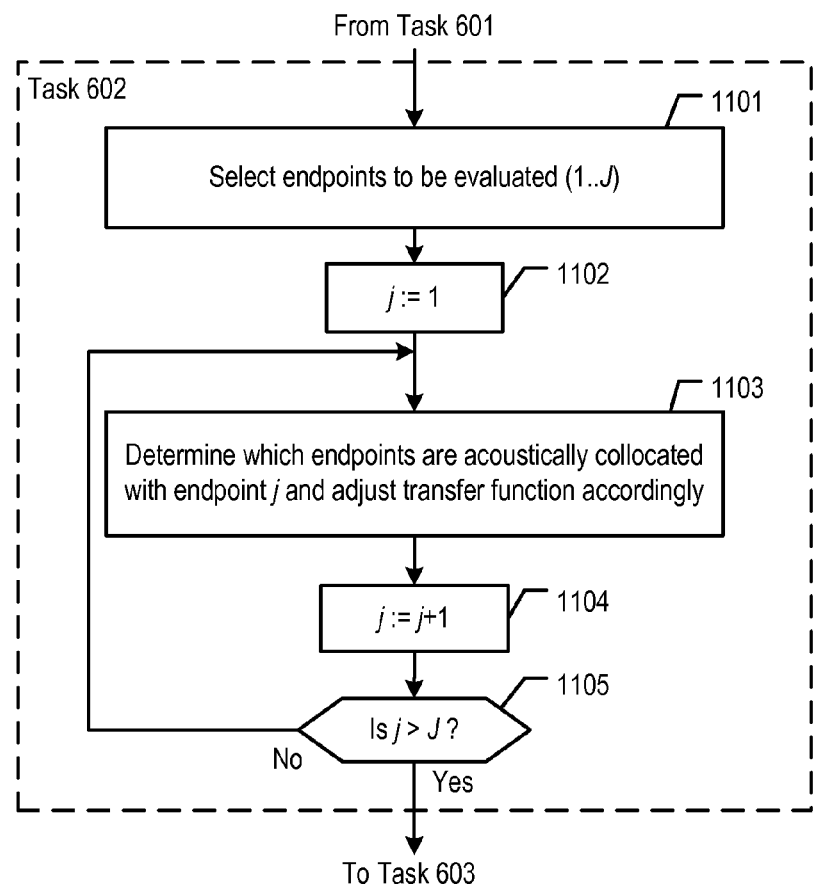
FIG. 11 depicts a flowchart of the salient subtasks that are related to determining acoustic collocation, as part of task 602.

FIG. 11 depicts a flowchart of the salient subtasks that are related to determining acoustic collocation, as part of task 602, in accordance with the illustrative embodiment of the present invention.

At task 1101, bridge 304 selects endpoints 301-1 through 301-J to be evaluated. The actual endpoints that are to be evaluated are based on the determination made earlier as to which endpoints are part of the conference call.

At task 1102, bridge 304 initializes endpoint pointer j to 1.

At task 1103, bridge 304 determines which endpoints are acoustically collocated with endpoint 301-*j* and accordingly adjusts the mixer transfer function that corresponds to the output signal to endpoint 301-*j*. Task 1103 is described below and with respect to FIG. 14.

At task 1104, bridge 304 increments pointer j.

At task 1105, bridge 304 determines whether acoustic collocation has been determined for all J selected endpoints being evaluated. If all endpoints have been checked, task execution proceeds to task 603. Otherwise, task execution proceeds back to task 1103.

Figure 12:
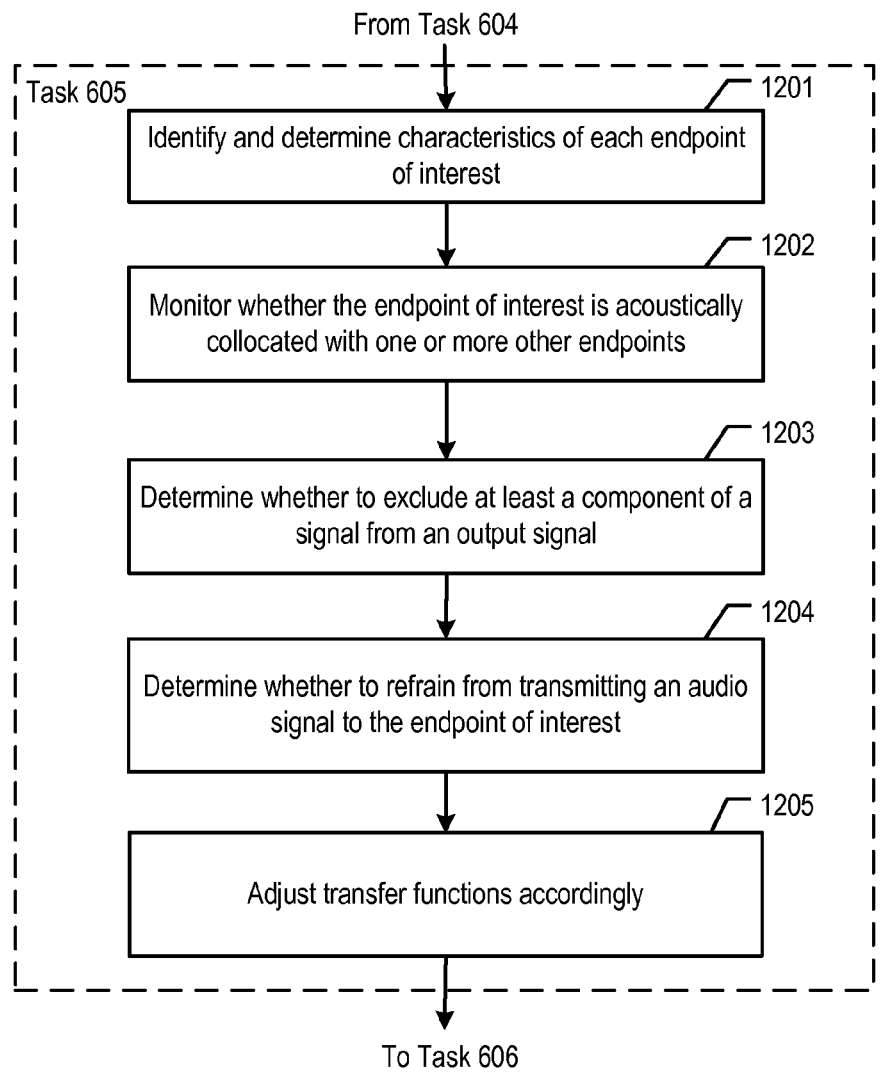
FIG. 12 depicts a flowchart of the salient subtasks that are related to accounting for cell phone or other portable endpoint, as part of task 605.

FIG. 12 depicts a flowchart of the salient subtasks that are related to adapting to cell phones or other endpoints that enter or leave a sound field, as part of task 605, in accordance with the illustrative embodiment of the present invention.

At task 1201, bridge 304 identifies and determines the characteristics of each endpoint of interest—that is, each endpoint that is capable of appearing in, moving in, or disappearing from the sound field in which it is present. For example, the endpoint might be a cell phone or other wireless telephone. The endpoints of interest can be identified to bridge 304 by a conference call participant, by private branch exchange 302, or through some other means. In accordance with the illustrative embodiment, bridge 304 queries exchange 302 about a particular endpoint that is dialing into the conference call, to which exchange 302 might respond by identifying the endpoint as that of an employee and as being a cell phone in terminal type. In some embodiments, bridge 304 additionally determines one or more other characteristics of the endpoint.

At task 1202, bridge 304 monitors whether the endpoint of interest is acoustically collocated with one or more other endpoints. In accordance with the illustrative embodiment, bridge 304 infers collocation by tracking the geo-location of the endpoint and comparing the endpoint's geo-location with the geo-locations of one or more conference telephones whose geo-locations have been predetermined and stored in a database accessible by the bridge. It will be clear to those skilled in the art how to determine and store the geo-location of one or more cell phones. When the cell phone comes within a predetermined distance from the conference telephone, as determined from the difference in their geo-locations, bridge 304 infers that the cell phone and conference telephone have become collocated.

It will be clear to those skilled in the art, in some alternative embodiments, how to determine acoustic collocation through other means. For example, the tasks described below and with respect to FIG. 14 can be adapted to acoustically determine collocation of a cell phone with a conference telephone.

At task 1203, bridge 304 determines whether to exclude at least a component of a signal from an output signal (i.e., a signal to be transmitted to one of the endpoints in a conference call). For example, when it is determined that a cell phone is acoustically collocated with a conference telephone, bridge 304 will exclude some or all of the signal received from the cell phone from the signal to be transmitted to the conference telephone, in order to prevent feedback.

At task 1204, bridge 304 determines whether to refrain from transmitting a signal to the endpoint of interest. In accordance with the illustrative embodiment, bridge 304 concludes that an endpoint is being used as a satellite microphone when the endpoint i) is a cell phone, as determined earlier, and ii) either is not moving and/or is within a predetermined distance from (or acoustically collocated with) the conference telephone. In this case, there would be no need to provide an audio signal to the cell phone since no one is using the cell phone to listen. In some embodiments, bridge 304 can determine that a cell phone is not moving by comparing successive geo-location measurements of the phone. In some alternative embodiments, bridge 304 bases the decision to refrain on a predetermined characteristic of a signal that is used to determine acoustic collocation, such as audio level.

Conversely, when bridge 304 determines that the endpoint of interest is moving away from the collocated conference phone, the bridge can resume transmitting an audio signal to the endpoint.

At task 1205, bridge 304 adjusts the mixer transfer function for each output channel, based on one or more of the other subtasks that constitute task 605. Task execution then proceeds to task 606.

Figure 13:
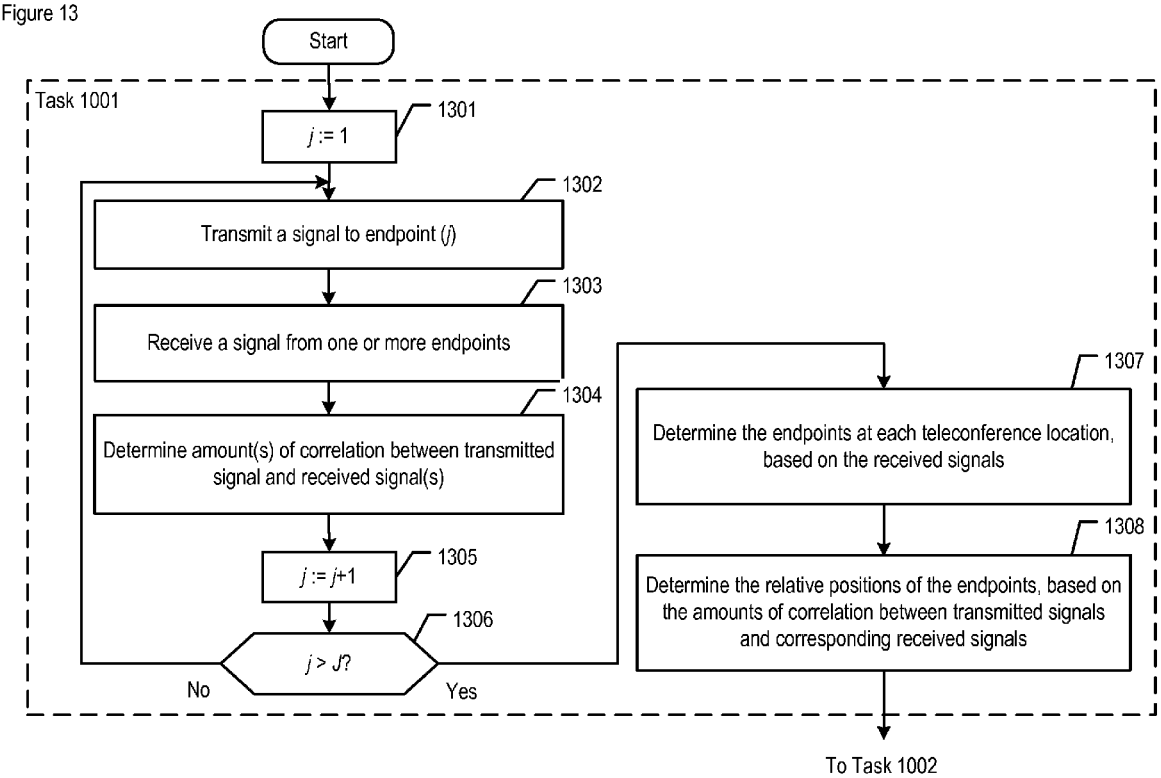
FIG. 13 depicts a flowchart of the salient subtasks that are related to acoustically determining the presence of endpoints, as part of task 1001 of FIG. 10.

FIG. 13 depicts a flowchart of the salient subtasks that are related to acoustically determining the presence of endpoints, as part of task 1001, in accordance with the illustrative embodiment of the present invention.

As part of the tasks that are described here with respect to FIG. 13, bridge 304 plays a special audio signal (e.g., a tone, etc.) out of the loudspeaker of each endpoint 301-1 through 301-J. While each tone is played out, bridge 304 listens through the microphones of the other phones. Bridge 304 then correlates the received audio signals with those generated by the bridge. By initializing in this way, bridge 304 is able to determine which of the $M_L$ microphones and $N_L$ loudspeakers are at each of teleconference locations 310-1 through 310-L (i.e., are together in the same sound field), as well as their relative positions at each location.

At task 1301, bridge 304 initializes endpoint pointer j to 1.

At task 1302, bridge 304 transmits a predetermined signal $x_0$ to endpoint 301-j. As those who are skilled in the art will appreciate, after reading this specification, signal $x_0$'s characteristics (e.g., audio level, frequency, duty cycle, etc.) are selected to allow other endpoints to detect the played signals when those endpoints are proximate to endpoint 301-j.

At task 1303, bridge 304 receives signals from one or more endpoints, including audio signals being detected by the microphones at the endpoints. The audio signals might comprise predetermined signal $x_0$ that is being played from endpoint 301-j's loudspeaker at the teleconference location currently being assessed.

At task 1304, bridge 304 determines the amount of correlation between predetermined signal $x_0$ (i.e., the signal being transmitted at endpoint 301-j) and each signal received from one or more of the other endpoints.

At task 1305, bridge 304 increments endpoint pointer j.

At task 1306, bridge 304 determines whether all J endpoints have been evaluated. If they have all been evaluated, task execution proceeds to task 1307. Otherwise, task execution proceeds back to task 1302.

At task 1307, bridge 304 determines which endpoints are at each teleconference location, based on the signals received at task 1303 for each endpoint 301-j. In accordance with the illustrative embodiment, bridge 304 examines the signal strength of each received signal and compares the signal strength to a predetermined threshold. If the signal strength exceeds the threshold, the corresponding endpoint is determined to be present at the same teleconference location as endpoint 301-j that played the signal via its loudspeaker. As those who are skilled in the art will appreciate, a property of the received signals other than signal strength, such as the amount of correlation, can be used to determine the presence of endpoints at each teleconference location.

At task 1308, bridge 304 determines the relative positions of endpoints 301-1 through 301-J, based on the amounts of correlation between the signals transmitted at task 1302 and the corresponding signals received at task 1303. In accordance with the illustrative embodiment, bridge 304 examines a characteristic of the correlation between the transmitted signal and each received signal, as determined at task 1304, and compares the correlation to one or more predetermined thresholds. Depending on which thresholds are exceeded by which received signals, bridge 304 infers relative positions between each endpoint that detects a signal and endpoint 301-j that played the transmitted signal. Bridge 304 then infers additional information about the relative positions by performing the threshold test on the other sets of signal correlations that correspond to other received signals compared against the signals played from other endpoints at the same teleconference location. As those who are skilled in the art will appreciate, a property of the received signals other than the amount of correlation can be used to determine the relative positions of the endpoints at each teleconference location.

After task 1308, task execution proceeds to task 1002.

Figure 14:
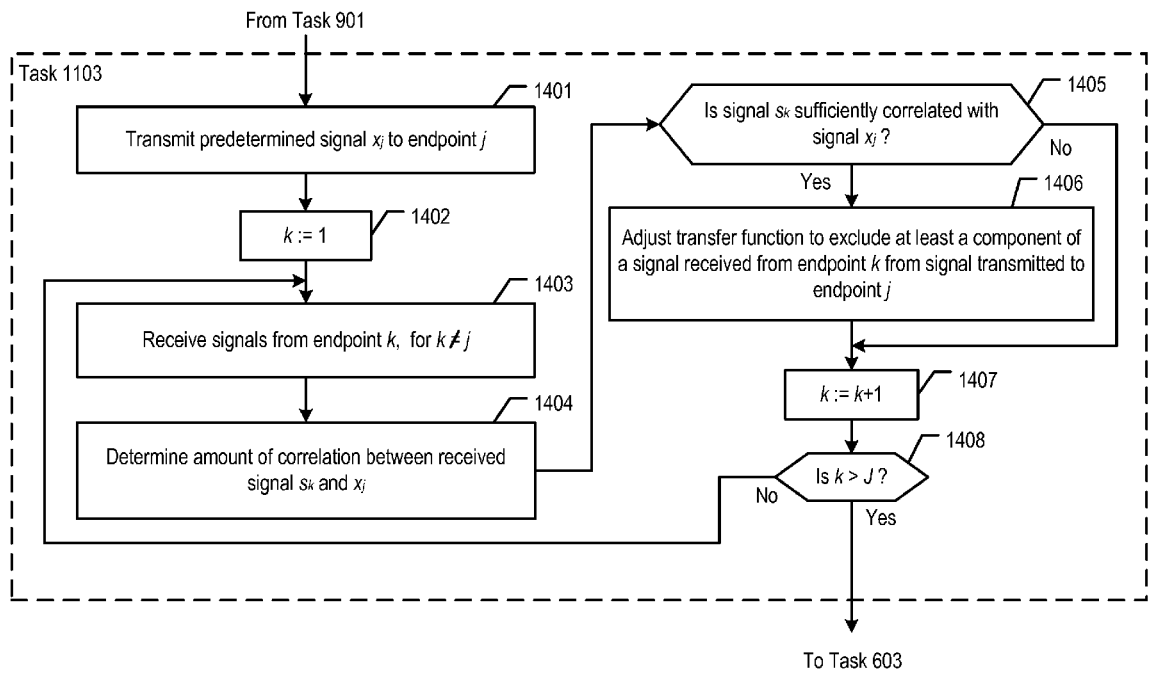
FIG. 14 depicts a flowchart of the salient subtasks that are related to determining which endpoints are acoustically collocated with endpoint 301-j, as part of task 1103 of FIG. 11.

FIG. 14 depicts a flowchart of the salient subtasks that are related to determining which endpoints are acoustically collocated with endpoint 301-j, as part of task 1103, in accordance with the illustrative embodiment of the present invention. Determining acoustic collocation is important when two or more endpoints—for example, cell phone 301-4 and conference phone 301-5—are at the same conferencing location; the collocated endpoints need not receive each other's audio, since the participants are in the same sound field and can hear each other directly.

As part of the tasks that are described here with respect to FIG. 14, bridge 304 plays a special audio signal (e.g., a tone, etc.) out of endpoint 301-j's loudspeaker. While the tone is played out, bridge 304 listens through the microphones of the other phones being evaluated with respect to endpoint 301-j. Bridge 304 then determines whether the received audio signals are sufficiently correlated with the tone generated by the bridge. In accordance with the illustrative embodiment, bridge 304 performs the described tasks before the conference call starts. However, it will be clear to those skilled in the art, after reading this specification, how to make and use embodiments of the present invention in which the determination of whether some signals are sufficiently correlated—or the determination of acoustic collocation in general—is performed during the conference call.

Although the tasks described here evaluate all endpoints with respect to each endpoint 301-j, it will be clear to those skilled in the art how to evaluate only a subset of the endpoints on a conference call, for each endpoint 301-j. For example, once the endpoints at each teleconference location have been determined, it might be advantageous to evaluate only those endpoints at the same teleconference location as endpoint 301-j.

Moreover, in accordance with the illustrative embodiment, the audio signal for determining collocation is transmitted to the endpoints one endpoint at a time. However, it will be clear to those skilled in the art, after reading this specification, how to make and use embodiments of the present invention in which the audio signals are transmitted to multiple endpoints concurrently in order to identify multiple sets of collocated endpoints concurrently. For example, those transmitted audio signals can be formed so that they will not interfere with each other (i.e., they are acoustically orthogonal with respect to each other).

At task 1401, bridge 304 transmits a predetermined signal $x_j$ to endpoint 301-j. As those who are skilled in the art will appreciate, after reading this specification, signal $x_j$'s characteristics (e.g., level, frequency, duty cycle, etc.) are selected to allow other endpoints to pick up the played signals, when those endpoints are proximate to endpoint 301-j.

At task 1402, bridge 304 initializes endpoint pointer k to 1.

At task 1403, bridge 304 receives a signal $s_k$ from endpoint 301-k, when k is not equal to j, including audio signals being picked up by endpoint 301-k's microphone. The audio signals might comprise predetermined signal $x_j$ that is being transmitted from endpoint 301-j's loudspeaker at the teleconference location currently being assessed.

At task 1404, bridge 304 determines the amount of correlation between received signal $s_k$ and predetermined signal $x_j$ (i.e., the signal being transmitted at endpoint 301-j). In accordance with the illustrative embodiment, bridge 304 compares the correlation to a predetermined threshold; if the correlation amount exceeds the threshold, received signal $s_k$ is considered to be sufficiently correlated with signal $x_j$.

At task 1405, bridge 304 checks whether signal $s_k$ is sufficiently correlated with signal $x_j$. If there is sufficient correlation, task execution proceeds to task 1406. Otherwise, task execution proceeds to task 1407.

At task 1406, bridge 304 adjusts the mixer transfer function that corresponds to the output signals to be transmitted to endpoint 301-j, to exclude at least a component of a signal received from endpoint 301-k.

At task 1407, bridge 304 increments endpoint pointer k.

At task 1408, bridge 304 determines whether all endpoints have been evaluated. If they have all been evaluated, task execution proceeds to task 603. Otherwise, task execution proceeds back to task 1403.

In accordance with the illustrative embodiment, acoustic collocation is determined acoustically, as described with respect to FIG. 14. It will be clear to those skilled in the art, after reading this specification, how to determine acoustic collocation through non-acoustic means—for example, by applying the technique of using geo-location measurements that is described above and with respect to task 1202.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
   determining, at a teleconference bridge, the presence of
      i) a first endpoint and a second endpoint at a first teleconference location, said teleconference bridge being able to receive audio signals from each of said first endpoint and said second endpoint, and
      ii) a third endpoint and a fourth endpoint at a second teleconference location, said teleconference bridge being able to transmit audio signals to each of said third endpoint and said fourth endpoint,
   wherein said first teleconference location and said second teleconference location are acoustically isolated from each other;
   assigning
      i) said first endpoint and said third endpoint to a first audio channel, and
      ii) said second endpoint and said fourth endpoint to a second audio channel;
   receiving
      i) a first audio signal from said first endpoint, and
      ii) a second audio signal from said second endpoint; and
   transmitting
      i) a third audio signal to all endpoints that have been assigned to said first audio channel at said second teleconference location, wherein said third audio signal is based on said first audio signal, and
      ii) a fourth audio signal to all endpoints that have been assigned to said second audio channel at said second teleconference location, wherein said fourth audio signal is based on said second audio signal.

2. The method of claim 1 further comprising:
   receiving
      iii) a fifth audio signal from said third endpoint, and
      iv) a sixth audio signal from said fourth endpoint; and
   transmitting
      iii) a seventh audio signal to all endpoints that have been assigned to said first audio channel at said first teleconference location, wherein said seventh audio signal is based on said fifth audio signal, and
      iv) an eighth audio signal to all endpoints that have been assigned to said second audio channel at said first teleconference location, wherein said eighth audio signal is based on said sixth audio signal.

3. The method of claim 2 wherein said seventh audio signal further comprises a first attenuated signal, wherein said first attenuated signal is based on said sixth audio signal adjusted by a predetermined attenuation factor.

4. The method of claim 3 wherein said eighth audio signal further comprises a second attenuated signal, wherein said second attenuated signal is based on said fifth audio signal adjusted by said predetermined attenuation factor.

5. The method of claim 2 further comprising:
   determining, at said teleconference bridge, the presence of
      iii) a fifth endpoint at said first teleconference location, wherein said teleconference bridge is also able to receive audio signals from said fifth endpoint;
   assigning iii) said fifth endpoint to said first audio channel; and
   receiving v) a ninth audio signal from said fifth endpoint;
   wherein said third audio signal is based on at least one of said first audio signal and said ninth audio signal.

6. The method of claim 2 further comprising:
determining, at said teleconference bridge, the presence of
   iii) a fifth endpoint at said first teleconference location, said teleconference bridge being able to receive audio signals from said fifth endpoint, and
   iv) a sixth endpoint at said second teleconference location, said teleconference bridge being able to transmit audio signals to said sixth endpoint;
assigning iii) said fifth endpoint and said sixth endpoint to a third audio channel, wherein the assigning of endpoints to each of said first audio channel, said second audio channel, and said third audio channel is based on the relative positions of the endpoints at said first teleconference location and the relative positions of the endpoints at said second teleconference location coinciding with each other;
receiving v) a ninth audio signal from said fifth endpoint; and
transmitting v) a tenth audio signal to all endpoints that have been assigned to said third audio channel at said second teleconference location, wherein said tenth audio signal is based on said ninth audio signal.

7. The method of claim 6 further comprising:
transmitting, from said teleconference bridge, vi) an eleventh audio signal to said first endpoint;
receiving
   vi) a twelfth audio signal from said second endpoint, and
   vii) a thirteenth audio signal from said fifth endpoint; and
determining the relative positions of said first endpoint, said second endpoint, and said fifth endpoint, based on the amount of correlation of said twelfth audio signal with said eleventh audio signal and on the amount of correlation of said thirteenth audio signal with said eleventh audio signal.

8. A method comprising:
determining, at a teleconference bridge, the presence of
   i) $M_1$ endpoints that each comprise a microphone, at a first teleconference location, $M_1$ being a integer greater than one, and
   ii) $N_2$ endpoints that each comprise a loudspeaker, at a second teleconference location, $N_2$ being a integer greater than one,
wherein said teleconference bridge is able to receive audio signals from each of said $M_1$ endpoints and is able to transmit audio signals to each of said $N_2$ endpoints, and wherein said first teleconference location and said second teleconference location are acoustically isolated from each other;
assigning
   i) a first nonempty subset of said $M_1$ endpoints and a second nonempty subset of said $N_2$ endpoints to a first audio channel, and
   ii) a third nonempty subset of said $M_1$ endpoints and a fourth nonempty subset of said $N_2$ endpoints to a second audio channel,
wherein said first subset and said third subset are non-intersecting, and wherein said second subset and said fourth subset are non-intersecting;
receiving
   i) a first audio signal from a first endpoint in said first subset, and
   ii) a second audio signal from a second endpoint in said third subset; and
transmitting
   i) a third audio signal to all endpoints in said second subset, wherein said third audio signal is based on said first audio signal, and
   ii) a fourth audio signal to all endpoints in said fourth subset, wherein said fourth audio signal is based on said second audio signal.

9. The method of claim 8 further comprising:
determining, at a teleconference bridge, the presence of
   iii) $M_2$ endpoints that each comprise a microphone, at said second teleconference location, $M_2$ being a integer greater than one, and
   iv) $N_1$ endpoints that each comprise a loudspeaker, at said first teleconference location, $N_1$ being a integer greater than one,
wherein said teleconference bridge is able to receive audio signals from each of said $M_2$ endpoints and is able to transmit audio signals to each of said $N_1$ endpoints;
assigning
   iii) a fifth nonempty subset of said $M_2$ endpoints and a sixth nonempty subset of said $N_1$ endpoints to said first audio channel, and
   iv) a seventh nonempty subset of said $M_2$ endpoints and an eighth nonempty subset of said $N_1$ endpoints to said second audio channel,
wherein said fifth subset and said seventh subset are non-intersecting, and wherein said sixth subset and said eighth subset are non-intersecting;
receiving
   iii) a fifth audio signal from a third endpoint in said fifth subset, and
   iv) a sixth audio signal from a fourth endpoint in said seventh subset; and transmitting
   iii) a seventh audio signal to all endpoints in said sixth subset, wherein said seventh audio signal is based on said fifth audio signal, and
   iv) an eighth audio signal to all endpoints in said eighth subset, wherein said eighth audio signal is based on said sixth audio signal.

10. The method of claim 9 wherein $M_1$ is greater than $N_2$.
11. The method of claim 9 wherein $M_1$ is less than $N_2$.
12. The method of claim 9 wherein $M_1$ is greater than $N_1$.
13. The method of claim 9 wherein $M_1$ is less than $N_1$.
14. The method of claim 9 further comprising:
assigning v) a ninth nonempty subset of said $M_1$ endpoints to a third audio channel, wherein said first subset, said third subset, and said ninth subset are non-intersecting; and
receiving v) a ninth audio signal from a fifth endpoint in said ninth subset;
wherein said third audio signal and said fourth audio signal are also based on said ninth audio signal.

15. The method of claim 9 further comprising:
assigning v) a ninth nonempty subset of said $N_2$ endpoints to a third audio channel, wherein said second subset, said fourth subset, and said ninth subset are non-intersecting; and
transmitting v) a ninth audio signal to a fifth endpoint in said ninth subset;
wherein said ninth audio signal is based on said first audio signal and said second audio signal.

16. The method of claim 9 further comprising:
assigning v) a ninth, non-empty subset of said $M_1$ endpoints and a tenth, non-empty subset of said $N_2$ endpoints to a third audio channel, wherein said first subset, said third subset, and said ninth subset are non-intersecting and said second subset, said fourth subset, and said tenth subset are non-intersecting, and wherein the assigning of said ninth subset and said tenth subset to said third audio channel is based on the relative positions of the endpoints at said first teleconference location and the relative positions of the endpoints at said second teleconference location coinciding with each other;

receiving v) a ninth audio signal from a fifth endpoint in said ninth subset; and transmitting v) a tenth audio signal to a sixth endpoint in said tenth subset;

wherein said tenth audio signal is based on said ninth audio signal.

17. The method of claim 16 further comprising:
transmitting, from said teleconference bridge, vi) an eleventh audio signal to said first endpoint;
receiving
   vi) a twelfth audio signal from said second endpoint, and
   vii) a thirteenth audio signal from said fifth endpoint; and
determining the relative positions of said first endpoint, said second endpoint, and said fifth endpoint, based on the amount of correlation of said twelfth audio signal with said eleventh audio signal and on the amount of correlation of said thirteenth audio signal with said eleventh audio signal.

18. A method comprising:
determining, at a teleconference bridge, the presence of
   i) $M_1$ endpoints that each comprise a microphone, at a first teleconference location, $M_1$ being a integer greater than one,
   ii) $N_2$ endpoints that each comprise a loudspeaker, at a second teleconference location, $N_2$ being a integer greater than one,
   iii) $M_2$ endpoints that each comprise a microphone, at said second teleconference location, $M_2$ being a integer greater than one, and
   iv) $N_1$ endpoints that each comprise a loudspeaker, at said first teleconference location, $N_1$ being a integer greater than one,
wherein said teleconference bridge is able to receive audio signals from each of said $M_1$ endpoints and said $M_2$ endpoints and is able to transmit audio signals to each of said $N_2$ endpoints and said $N_1$ endpoints, and wherein said first teleconference location and said second teleconference location are acoustically isolated from each other;

transmitting, from said teleconference bridge,
   i) a first audio signal to a first endpoint of said $N_2$ endpoints, and
   ii) a second audio signal to a second endpoint of said $N_1$ endpoints;

receiving
   i) a third audio signal from a third endpoint of said $M_2$ endpoints,
   ii) a fourth audio signal from a fourth endpoint of said $M_2$ endpoints,
   iii) a fifth audio signal from a fifth endpoint of said $M_1$ endpoints, and
   iv) a sixth audio signal from a sixth endpoint of said $M_1$ endpoints; and determining
   i) the relative positions of said first endpoint, said third endpoint, and said fourth endpoint with respect to one another, based on the amount of correlation of said third audio signal with said first audio signal and on the amount of correlation of said fourth audio signal with said first audio signal, and
   ii) the relative positions of said second endpoint, said fifth endpoint, and said sixth endpoint with respect to one another, based on the amount of correlation of said fifth audio signal with said second audio signal and on the amount of correlation of said sixth audio signal with said second audio signal.

19. The method of claim 18 further comprising:
assigning
   i) a first nonempty subset of said $M_1$ endpoints, a second nonempty subset of said $N_2$ endpoints, a third nonempty subset of said $M_2$ endpoints, and a fourth nonempty subset of said $N_1$ endpoints to a first audio channel, and
   ii) a fifth nonempty subset of said $M_1$ endpoints, a sixth nonempty subset of said $N_2$ endpoints, a seventh nonempty subset of said $M_2$ endpoints, and an eighth nonempty subset of said $N_1$ endpoints to a second audio channel,
wherein said first subset and said fifth subset are non-intersecting, and wherein said second subset and said sixth subset are non-intersecting.

20. The method of claim 19 further comprising:
receiving
   v) a seventh audio signal from said fifth endpoint in said first subset, and
   vi) a eighth audio signal from sixth endpoint in said fifth subset; and
transmitting
   iii) a ninth audio signal to all endpoints in said second subset, wherein said ninth audio signal is based on said seventh audio signal, and
   iv) a tenth audio signal to all endpoints in said sixth subset, wherein said tenth audio signal is based on said eighth audio signal.

21. The method of claim 20 wherein $M_1$ is greater than $N_2$.
22. The method of claim 20 wherein $M_1$ is less than $N_2$.
23. The method of claim 20 wherein $M_1$ is greater than $N_1$.
24. The method of claim 20 wherein $M_1$ is less than $N_1$.
25. The method of claim 20 further comprising:
assigning iii) a ninth nonempty subset of said $M_1$ endpoints to a third audio channel, wherein said first subset, said fifth subset, and said ninth subset are non-intersecting; and
receiving v) a eleventh audio signal from a seventh endpoint in said ninth subset;
wherein said ninth audio signal and said tenth audio signal are also based on said eleventh audio signal.

26. The method of claim 20 further comprising:
assigning iii) a ninth nonempty subset of said $N_2$ endpoints to a third audio channel, wherein said second subset, said sixth subset, and said ninth subset are non-intersecting; and
transmitting v) a eleventh audio signal to a seventh endpoint in said ninth subset;
wherein said eleventh audio signal is based on said seventh audio signal and said eighth audio signal.

27. The method of claim 20 further comprising:
assigning iii) a ninth nonempty subset of said $M_1$ endpoints and a tenth nonempty subset of said $N_2$ endpoints to a third audio channel, wherein said first subset, said fifth subset, and said ninth subset are non-intersecting and said second subset, said sixth subset, and said tenth subset are non-intersecting;
receiving v) a twelfth audio signal from a seventh endpoint in said ninth subset; and transmitting v) a thirteenth audio signal to an eighth endpoint in said tenth subset, wherein said thirteenth audio signal is based on said twelfth audio signal; and wherein the assigning of said ninth subset and said tenth subset to said third audio channel is based on the relative positions of said fifth endpoint and said seventh endpoint coinciding with the relative positions of said first endpoint and said eighth endpoint.

\* \* \* \* \*